Dec. 12, 1967 R. G. CHASE 3,357,613
LOAD OR COMPONENT RESTRAINT HARNESS
Filed Feb. 7, 1966 2 Sheets-Sheet 1

INVENTOR
Ronald G. Chase
BY
ATTORNEYS

Dec. 12, 1967  R. G. CHASE  3,357,613
LOAD OR COMPONENT RESTRAINT HARNESS
Filed Feb. 7, 1966  2 Sheets-Sheet 2
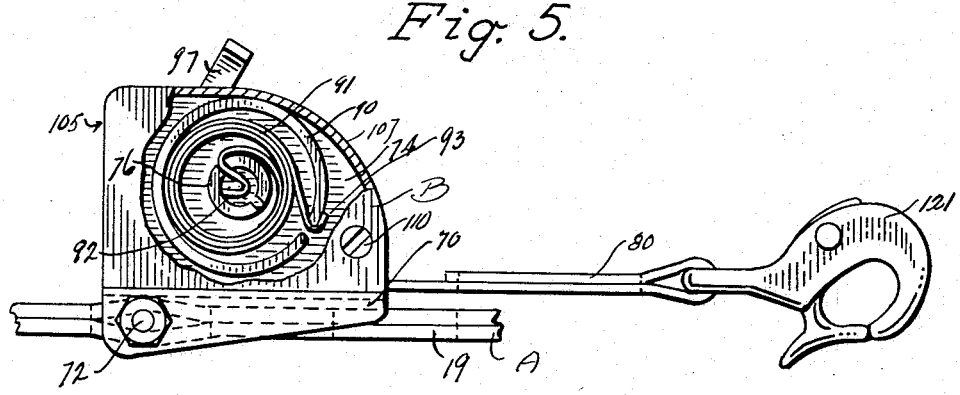
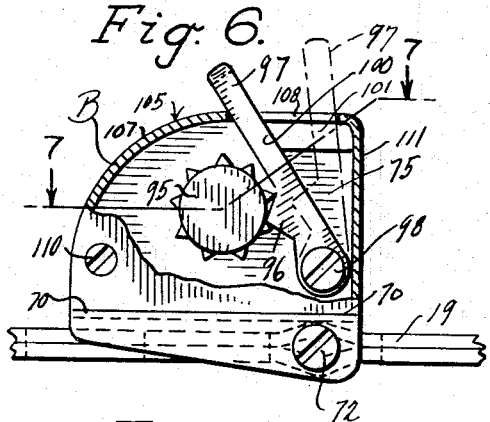
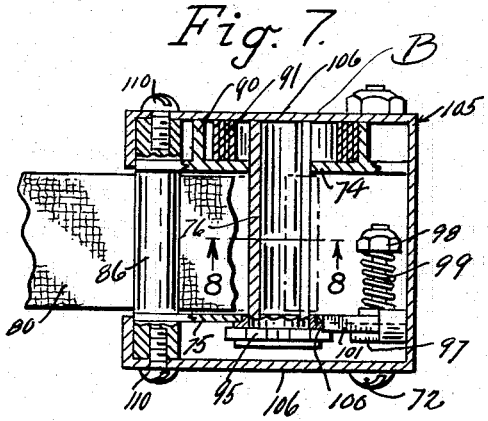
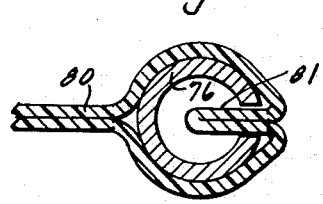
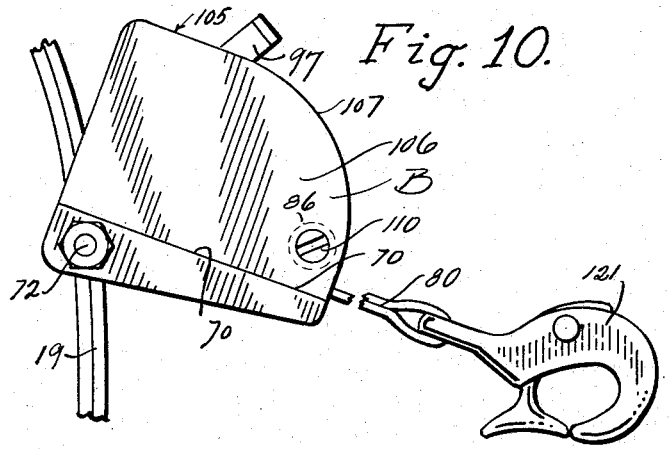
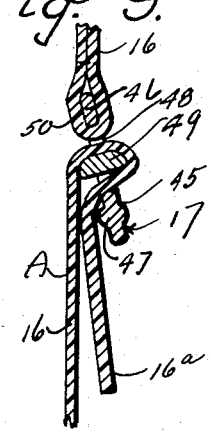
INVENTOR
Ronald G. Chase.
BY
ATTORNEYS

United States Patent Office 3,357,613
Patented Dec. 12, 1967

3,357,613
LOAD OR COMPONENT RESTRAINT HARNESS
Ronald G. Chase, Sepulveda, Calif., assignor to Irving Air Chute, Inc., Lexington, Ky., a corporation of New York
Filed Feb. 7, 1966, Ser. No. 525,676
4 Claims. (Cl. 224—5)

This invention relates to an improved load or component restraint harness adaptable for supporting loads of various weights and bulk in such manner as to permit working freedom of the arms and legs of the wearer while transporting or holding the component or load.

A further object of this invention is the provision of a load or component restraint harness which is adaptable for supporting loads of various sizes and weights in such manner that the operator or wearer has working freedom of arms and legs with maneuverability in close working quarters.

Installing equipment in high places which are difficult of access, such as in connection with rocket vehicles, maneuverability of the operator is necessary but usually such movement is difficult of attainment. It is therefore a purpose of the present invention to provide an improved load restraining harness which will enable the support of a load by the wearer under such circumstances as to enable use by the wearer of hands and legs such as may be required in connection with equipment installation, climbing, walking and other body movements.

A further object of this invention is the provision of a load restraint harness capable of use in supporting a load with assured freedom of the wearer's limbs, and having means associated therewith by which a supporting strap of the harness may be reefed through an anchoring fixture such as a pipe, railing, etc. and secured to the harness for safety holding purposes.

A further object of this invention is the provision of a load restraint harness which will permit personnel to carry very heavy loads with usual working freedom of arms and legs.

A further object of this invention is the provision of an improved load restraint harness having means for load and weight distribution over a large area of the body of the wearer.

A further object of this invention is the provision of a load supporting body harness having improved retractable load supporting straps.

Other objects and advantages of this invention will be apparent during the course of the following detailed description.

In the accompanying drawings, forming a part of this specification, wherein similar reference characters designate corresponding parts throughout the several views:

FIG. 5 is a fragmentary side elevation of a web of the harness showing attached therewith a tether or load supporting line and means for reeling and unreeling the line for the purpose of length adjustment.

FIG. 6 is a fragmentary view of the retractor showing it in locked position to hold a definite adjustment of a tether line.

FIG. 7 is an enlarged cross sectional view taken substantially on the line 7—7 of FIG. 6.

FIG. 8 is an enlarged cross sectional view taken substantially on the line 8—8 of FIG. 7.

FIG. 9 is a cross sectional view taken substantially on the line 9—9 of FIG. 3 and more particularly showing means for length adjustment of the front body straps of the harness.

FIG. 10 is a view showing one of the positions of the retractor on a body strap when supporting a load; the retractor being pivoted to the harness for the support of loads of varying bulk.

Figure 1:
FIG. 1 is a front elevation of the improved load or component restraint harness showing the same attached to a wearer and indicating the extent to which the wearer's limbs are capable of maneuverability for climbing, walking and otherwise taking care of working duties.

In the drawings, wherein for the purpose of illustration is shown a preferred embodiment of the invention, the letter A may generally designate the harness per se, having load supporting retractors B adapted for the support of articles of various sizes, such as a load or component C.

The improved harness A is particularly adapted for supporting loads in such manner that the load is properly distributed upon the body of the wearer. Thus, the majority of the load is transferred to the front abdominal area and over a large portion of the back of the wearer.

The harness A may be fabricated of flexible nylon or other webbing, such as used in connection with parachute harnesses. The webbing or straps are of sufficient strength to withstand the support of heavy loads. It comprises right and left front straps or webs 15 and 16, connected by adjusting means 17 to shoulder straps or webs 18 and 19 respectively. The right and left shoulder webs or straps 18 and 19 are extended to and form part of back straps 21 and 22 which are crossed at a location 23 in the small of the back of a wearer and there secured together as by stitching. The harness also includes a belt 25 to encompass the waist of the wearer, comprising a rear portion 26 and front ends 27 and 28 adjustably connected to a buckle 29 similar to a safety belt buckle of the types shown in U.S. Patents 2,846,745 and 3,203,064. The crossed back straps 21 and 22 at their lower ends are secured, as by stitching 30 and 31, in overlapping relation with the extreme right and left portions of the belt 25.

Figure 3:
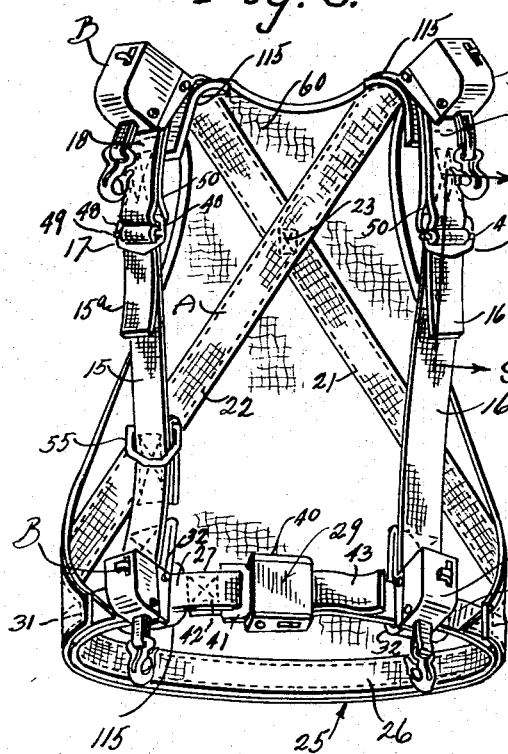
FIG. 3 is a front perspective view of the improved harness in assembled and connected relation.
Figure 4:
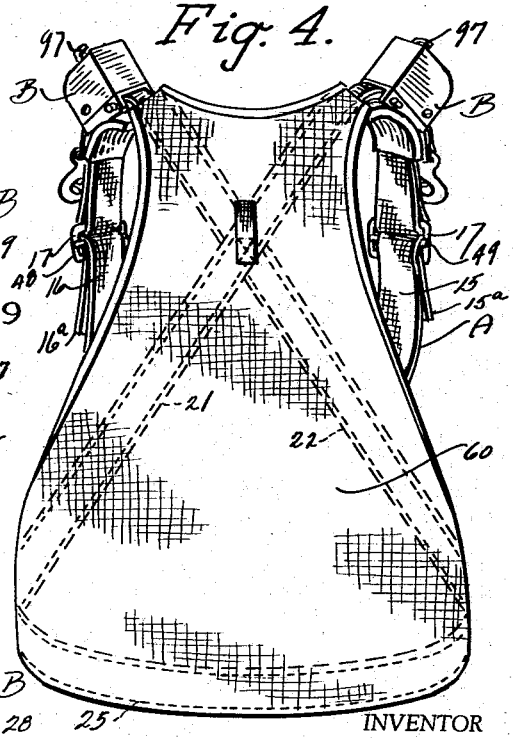
FIG. 4 is a rear view of the harness in assembled condition.

The riser front webs 15 and 16 at their lower ends are looped, as shown at 32, in FIG. 3 of the drawings, to slidably receive the end portions 27 and 28 of the belt 25 therethrough.

The buckle 29 is of the safety type including a main buckle casing portion 40 having a latch therein adapted to detachably connect with a locking tongue 41; the latter being secured as by stitching 42 upon the belt portion 27 and the latch supporting portion 40 being adjustably secured on the other portion 28 of the belt. The adjustment is effected in the well known construction by means of a pull strap or web 43 operating over a slidable retaining bar as disclosed in U.S. Patent 3,203,064.

Referring to the adjusting means 17, the same is provided for the purpose of adjusting the lengths of the front straps 15 and 16 and to effect the proper position of the shoulder straps and belt to suit the stature of the wearer. To that end the same comprises an adapter 45, such as detailed in FIG. 9 and shown in U.S. Patents 2,130.547 and 2,516,004. It comprises upper and lower bars 46 and 47 the ends of which are connected by side bars 48 (see FIG. 3) to define an opening within which slides a clamping bar 49, the ends of which are bifurcated to slide on the side bars 48. As to the position of the webbing or front strap portions on the adapter 17, the lower portions of said webbings 15 and 16 are looped around the clamping bars 49 and extended through the opening of the adapter frame, as shown in FIG. 9. The end portions 15$^a$ and 16$^a$ lie at the front of the respective webbing 15 and 16 so that a pull thereon will adjust the lengths of the straps 15 and 16. The upper bar 46 of each adapter is fixedly connected as by looping at 50 around the adapter bar 46. Under tension the straps 15 and 16 will cause the clamping bars 49 to move downwardly against the bar portions 47 and clamp the lower portions of the webbing in fixed position upon the adapter. To lengthen or shorten the straps 15 and 16 it is only necessary to adjust the ends 15ᵃ and 16ᵃ.

It will be noted from the drawings that the lower ends of the webbing straps 15 and 16 are looped as aforesaid at 32 to slidably receive the ends of the belt 25. An accessory supporting D ring 55 may be attached to one or both of the webs 15 and 16, as is shown in FIG. 3.

A flexible load distributing vest back 60 is secured as by stitching to the shoulder straps 18 and 19 and along the back straps 21 and 22. It also extends to and is secured to the rear surfaces of the belt back portion 26, as by stitching. The harness, including the vest 60, provides an integrated arrangement for transferring the majority of a load supported by retractors B to the fronal abdominal area whereas the vest 60 distributes the load over a large portion of the back of the wearer. In addition, the vest 60 provides during investment and divestment comfort to the wearer and prevents entanglement of the harness straps when being handled or stored.

The load supporting retractors B may be of any desired number, but preferably four of them will suffice to carry out the objects of the invention. They are located preferably on the shoulder straps adjacent the tops of the front straps 15 and 16 and also in the belt area upon the looped portions 32 at the bottom ends of the front straps or webbing 15 and 16.

The load supporting retractors B each includes a U-shaped flanged base 70, as shown in FIG. 5 of the drawings, adapted to straddle a shoulder strap, which in the example shown in FIG. 5, is the strap 19. The side flanges are secured between the webs of the strap 19 as by detachable bolt 72. This bolt acts as a pivot so the retractor B can swing to an outward position with respect to the webbing, such as shown in FIG. 10 whereby under load support deflection of the webbing will be avoided due to swinging of the tether or load supporting line to proper angle.

Welded or otherwise secured to the base 70 is a pair of outstanding walls 74 and 75 (see FIG. 7), adapted to support a rotatable shaft or drum 76. This shaft 76 has an end of the load supporting or tether line 80 secured thereto, as shown at 81 in FIG. 8, so that the tether line may be wound or unwound with respect to the drum 76. The tether line 80 is of a width to fit snugly in the space between the walls 74 and 75 (see FIG. 7). It extends from the base below a retaining bar 86 which is secured to and formed as part of the walls 74 and 75 and spaced from the base to provide a slot to guide the tether line as it enters and exits with respect to the casing of the retractor members.

At its outer side the wall 74 is provided with a segmental flange 90 spaced from the projecting end of the drum 76, and in this space there is located a spiral spring 91 secured at an end 92 to the shaft 76 and at its opposite end at 93 to the flange 90 (see FIG. 5). The spring 91 is normally biased to wind the tether line upon the shaft 76. The shaft 76 adjacent to the wall 75 and at the outer side thereof is provided with a keyed ratchet wheel 95 for rotation therewith, the teeth of which are adapted to be engaged by a pawl extension 96 located on a lever 97 pivoted at 98 on the wall 75. A spring 99 is provided, as shown in FIG. 7, normally urging the lever 97 against the wall 75. It can be locked in engagement with the wheel 95 by a lateral movement to position it against a shoulder 100 of an extension 101 which is secured to wall 75. To release the lever it is only necessary to laterally move the lever slightly to avoid hitting the shoulder 100 and swing it to the dot and dash line position shown in FIG. 6.

The retractor device B also includes a cover 105 having side walls 106 and a top wall 107. It is open at the lower end thereof to receive the details of the retractor. The top wall 107 is provided with a slot 108 therein to permit movement of the locking lever 97. The cover 105 is secured as by means of short bolts 110 attached to the ends of the retaining bar 86, as shown in FIG. 7. The cover has a back wall 111.

The load supporting reactors B each have a pad 115 beneath the webbing to prevent discomfort and bodily injury to the wearer. The pads are indicated in various views of the drawings and they are attached for the upper load supporting members B upon the shoulder straps at the under side thereof and for the lower reactors B the pads are attached to the inside surfaces of the front belt strap portions 27 and 28.

Figure 2:
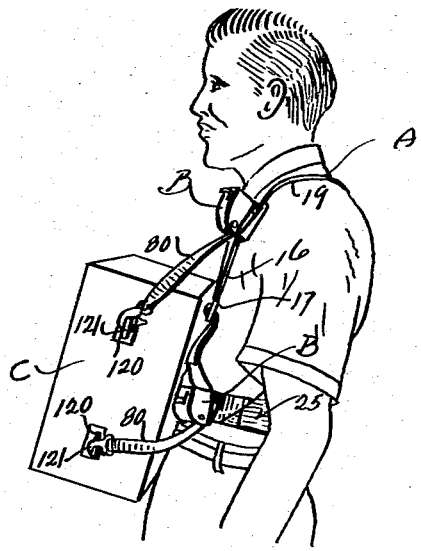
FIG. 2 is a side elevation of the improved load or component restraint harness showing the same supporting a load and fully indicating the freedom of arm movement of the wearer.

It will be obvious from FIGS. 1 and 2 that the arms and legs of the wearer will be free of obstruction when the wearer supports a load. The load C is usually provided with rings 120 adapted to receive the snap fasteners 121 located at the ends of the tether lines 80. The load C shown in FIG. 2 is provided at opposite sides with upper and lower rings 120, and the upper and lower retractors B at each side of the harness are snapped upon said rings. The tether lines are usually taut or just slightly loose and in this position the levers 97 when in position lock the tether lines against retraction as it quite obvious. The load is supported directly at the front of the wearer. It is obvious from the foregoing that the device when installing equipment in high places, which are difficult of access, such as in rocket vehicles, will permit a workman to use both hands while climbing. The device can be used as a safety harness by extending one load supporting tether line around any anchor fixture such as a pipe and securing it by the latching maens 121.

Various changes in the size, shape and arrangement of parts may be made to the form of invention shown and described without departing from the spirit of the invention or the scope of the claims.

I claim:

1. In an industrial harness construction, the combination of a releasable harness having means for attachment to the body of an individual with strap portions at each shoulder area and at each side of the harness at the waist area thereof, and load supporting means secured to the harness at each of said shoulder areas and at each side of the harness at the waist area, each load supporting means including a supporting frame, a rotary drum mounted on the supporting frame, a tether strap secured to said drum for winding thereon, and spring means biasing the drum to normally wind the strap thereon, each tether strap having a free end provided with load attaching means, and means to releasably lock the drum with the tether strap at a desired extension.

2. The industrial harness as described in claim 1 in which the supporting frame of each load supporting means is pivoted at its upper end above the rotary drum so as to follow the alignment taken by the tether strap when the latter is extended in load supporting position.

3. In an industrial harness construction, the combination of a releasable harness having means for attachment to the body of an individual including front straps, shoulder straps at the upper ends of the front straps, crossed back straps secured to the shoulder straps, a waist strap having ends at the front of the harness, said back straps at the lower ends being secured to the waist strap, the front straps being secured adjacent the ends of the waist strap, buckle means releasably securing the ends of the waist strap together, a plurality of load supporting means secured to the harness each including a tether strap located at the front of the harness at each front shoulder area and at each front side of the harness adjacent the wearer's waistline, each load supporting means having means for extensibly and retractably supporting its tether strap to support a load at the wearer's front and means to lock the tether strap at a desired extension, and a vest of flexible material secured to and along the back straps from the shoulders straps down to and including the waist strap along the rear thereof.

4. In an industrial harness construction, the combination of a releasable harness having means for attachment to the body of an individual including front straps, shoulder straps at the upper ends of the front straps, crossed back straps secured to the shoulder straps, a waist strap having ends at the front of the harness, said back straps at the lower ends being secured to the waist strap, the front straps being secured adjacent the ends of the waist strap, buckle means releasably securing the ends of the waist strap together, a plurality of load supporting means secured to the harness each including a tether strap located at the front of the harness at each front shoulder area and at each front side of the harness adjacent the wearer's waistline, each load supporting means having means for extensibly and retractably supporting its tether strap to support a load at the wearer's front and means to lock the tether strap at a desired extension, and body protecting pads secured to the harness straps at the rear surfaces thereof at each location of a load supporting means.

References Cited

UNITED STATES PATENTS

| | | | |
|---|---|---|---|
| 1,871,223 | 8/1932 | Reese | 224—12 X |
| 2,142,887 | 1/1939 | Dixon | 224—5 |
| 2,643,803 | 6/1953 | Bates | 224—5 |
| 3,198,300 | 8/1965 | Tuttle | 224—5 X |
| 3,258,182 | 6/1966 | McDonald | 224—5 X |

FOREIGN PATENTS

| | | |
|---|---|---|
| 166,788 | 2/1956 | Australia. |

GERALD M. FORLENZA, *Primary Examiner.*

F. E. WERNER, *Assistant Examiner.*